United States Patent
Pride, II et al.

(10) Patent No.: US 7,343,934 B2
(45) Date of Patent: Mar. 18, 2008

(54) PROPORTIONAL PRESSURE CONTROL VALVE WITH CONTROL PORT PRESSURE STABILIZATION

(75) Inventors: Steven R. Pride, II, Schoolcraft, MI (US); Charles J. Bowden, Battle Creek, MI (US)

(73) Assignee: Fema Corporation of Michigan, Portage, MI (US)

( * ) Notice: Subject to any disclaimer, the term of this patent is extended or adjusted under 35 U.S.C. 154(b) by 543 days.

(21) Appl. No.: 11/107,291

(22) Filed: Apr. 15, 2005

(65) Prior Publication Data

US 2006/0231147 A1  Oct. 19, 2006

(51) Int. Cl.
*F15B 13/044* (2006.01)

(52) U.S. Cl. .......................... 137/625.64; 137/625.69; 251/50

(58) Field of Classification Search ........... 137/625.64, 137/625.69; 251/50, 54
See application file for complete search history.

(56) References Cited

U.S. PATENT DOCUMENTS

| | | | | |
|---|---|---|---|---|
| 3,176,721 A | * | 4/1965 | Gordon | 251/50 |
| 3,589,401 A | | 6/1971 | Harding | |
| 3,777,482 A | * | 12/1973 | Canale et al. | 137/625.64 |
| 3,865,140 A | * | 2/1975 | Greenwood | 137/625.64 |
| 4,741,364 A | * | 5/1988 | Stoss et al. | 137/625.64 |
| 4,785,849 A | | 11/1988 | Masuda | |
| 4,827,981 A | | 5/1989 | Livecchi et al. | |
| 4,966,195 A | * | 10/1990 | McCabe | 137/625.64 |
| 5,031,663 A | * | 7/1991 | Fukuta et al. | 137/625.64 |
| 5,058,626 A | | 10/1991 | Takaoka et al. | |
| 5,546,847 A | * | 8/1996 | Rector et al. | 137/625.64 |
| 5,984,259 A | * | 11/1999 | Najmolhoda et al. | 251/50 |
| 6,021,876 A | | 2/2000 | Bowden et al. | |
| 6,029,703 A | * | 2/2000 | Erickson et al. | 137/625.64 |
| 6,571,828 B2 | | 6/2003 | Harms et al. | |

* cited by examiner

*Primary Examiner*—John Rivell
(74) *Attorney, Agent, or Firm*—Flynn, Thiel, Boutell & Tanis, P.C.

(57) ABSTRACT

A proportional pressure control valve which includes an electric first stage pilot having a single outlet port configured to provide a variable pressurized hydraulic fluid to the outlet port and at a pressure that is proportional to an electric input signal and which is variable between first and second values and further includes a second stage hydraulic valve which has a spool reciprocally moveable in a bore between first and second positions indicative of a full ON and a full OFF condition. A fluid isolation chamber is oriented in the bore and in a region between a control port and a tank port in the fluid pathway therebetween. The interior wall of the bore and the first and second diameter regions on the spool are configured to always provide a controlled volume fluid flow rate between the control port and the fluid isolation chamber.

10 Claims, 13 Drawing Sheets

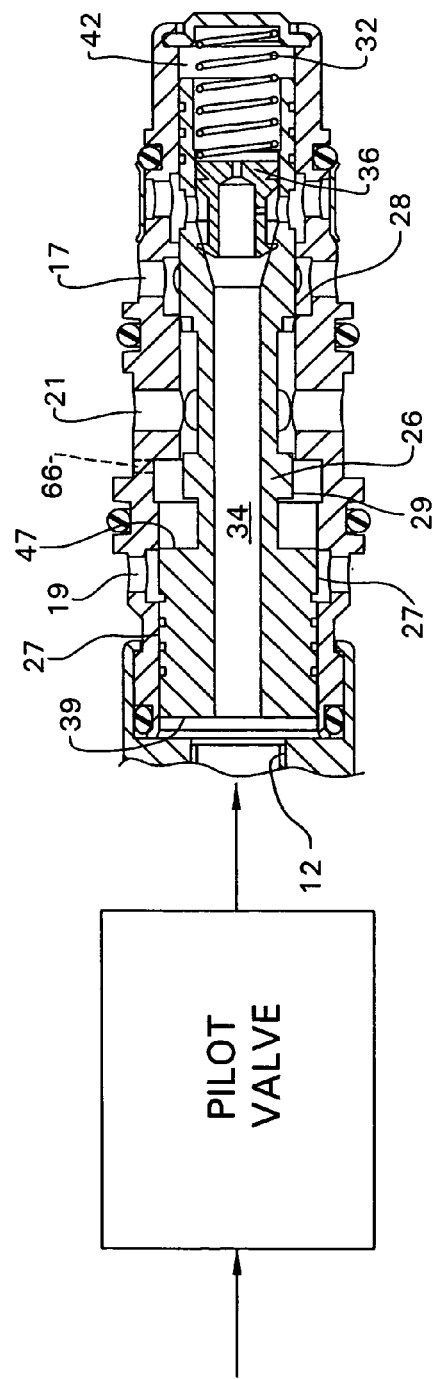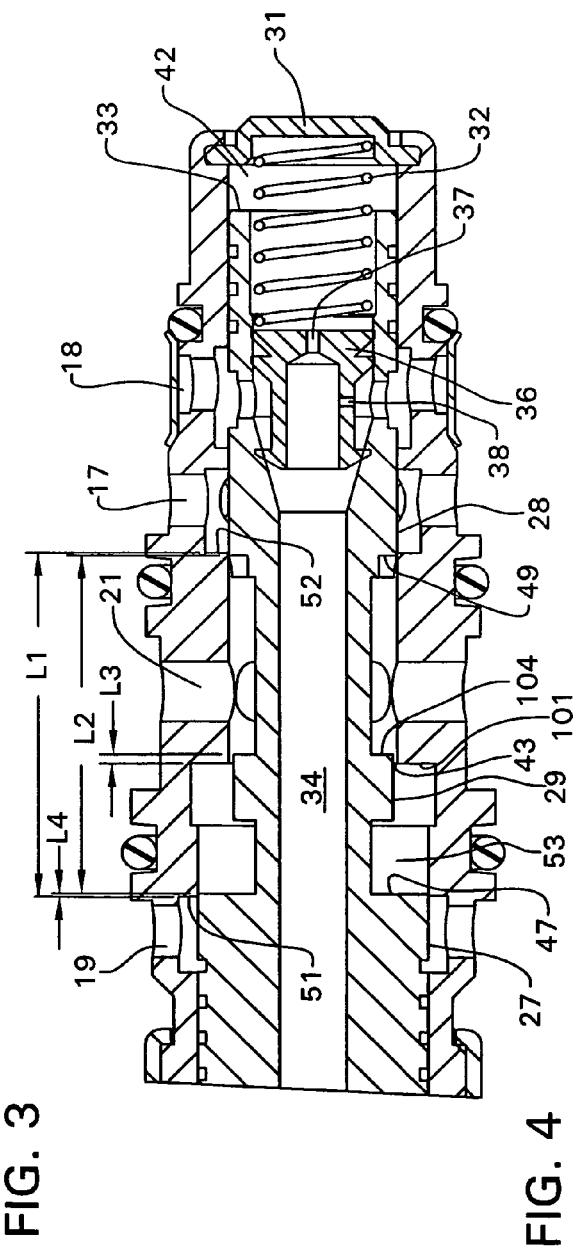
FIG. 3
FIG. 4

POSITION 1 [CORRESPONDING TO FIG. 2]

FIG. 11 POSITION 2 [CORRESPONDING TO FIG. 3 AND 4]

POSITION 3 [CORRESPONDING TO FIG. 3 AND 4]

FIG. 13 POSITION 4

POSITION 5

PROPORTIONAL PRESSURE CONTROL VALVE WITH CONTROL PORT PRESSURE STABILIZATION

FIELD OF THE INVENTION

This invention relates to a proportional pressure control valve and, more particularly, to a pilot operated two stage pressure control valve having a mechanism for limiting the period of axial oscillations of the spool relative to the valve body after the pilot has initiated an axial shifting of the spool to a position intermediate a full ON and a full OFF position to quickly bring the hydraulic fluid pressure in the control port to a predetermined level.

BACKGROUND OF THE INVENTION

In hydraulic valve technology, it is known to provide a chamber with a damping orifice in an area of the spool to improve high frequency valve stability. Typically, in this type of application, a feedback chamber is isolated from the control port via a damping orifice, and out of the normal hydraulic fluid flow path or the utilization of another spool chamber connected via a damping orifice to the first stage outlet port or hydraulic supply port is used. This type of valve configuration can bring about prolonged periods of axial low frequency oscillation of the spool with respect to the valve body. It is desirable to reduce the aforesaid prolonged period of axial oscillations.

Accordingly, it is an object of the invention to provide a proportional pressure control valve having one of the typical damping chamber plus a feedback chamber which is placed in the hydraulic fluid flow path between the control port and the tank port and configured not to inhibit the performance of the valve during a full ON episode and a full OFF episode.

It is a further object of the invention, as aforesaid, to provide a proportional pressure control valve wherein the prolonged period of continuous axial oscillations is eliminated.

It is a further object of the invention to provide a proportional pressure control valve, as aforesaid, wherein during the aforesaid period of axial oscillations, spool movement is arrested reducing oscillatory behavior of the spool.

It is a further object of the invention to provide a proportional pressure control valve, as aforesaid, wherein the aforesaid arrestment of axial oscillations causes an elimination in pressure oscillations.

It is a further object of the invention to provide a proportional pressure control valve, as aforesaid, wherein after the expiration of the period of axial oscillations, spool movement is arrested to maintain the hydraulic level at a predetermined level.

SUMMARY OF THE INVENTION

The objects and purposes of the invention are met by providing a proportional pressure control valve which includes an electric first stage pilot having a single outlet port configured to provide a variable pressurized hydraulic fluid to the outlet port and at a pressure that is proportional to an electric input signal and which is variable between first and second values. A second stage hydraulic valve is provided which has a valve body with a bore extending therein and a spool reciprocally moveable in the bore between first and second positions indicative of a full ON and a full OFF condition. A first end of the bore is coupled to the outlet port of the electric first stage pilot. A spring abutment is provided in the bore only at a second end remote from the first end and whereat a spring is provided to urge the spool to oppose the pressurized hydraulic fluid provided at the first stage outlet port. The second stage further includes a supply port, and control port and a tank port. The spool has plural regions of a first diameter and plural axially spaced lands of a second diameter greater than the first diameter and slidingly and sealingly engaging an interior wall of the bore to control a rate of hydraulic fluid flow and a pressure of the hydraulic fluid between the supply port and the control port as well as between the control port and the tank port in response to an axial movement of the spool relative to the valve body. A fluid isolation chamber is oriented in the bore and in a region between the control port and the tank port in the fluid pathway therebetween. The interior wall of the bore and the first and second diameter regions on the spool are configured to provide a controlled fluid pressure in the isolation chamber which is substantially less in magnitude than the fluid pressure in the control port while the spool is prevented from undergoing a prolonged period of axial oscillations with respect to the valve body after the first stage has initiated an axial shifting of the spool to the position intermediate one of the first and second positions.

BRIEF DESCRIPTION OF THE DRAWINGS

Other objects and purposes of this invention will be apparent to persons acquainted with proportional pressure control valves upon reading the following specification and inspecting the accompanying drawings, in which:

FIG. 3 is a view similar to FIG. 1 except that the spool is in the modulation position intermediate the full ON and full OFF positions;

FIG. 4 is an enlargement of a fragment of FIG. 3;

DETAILED DESCRIPTION

Figure 1:
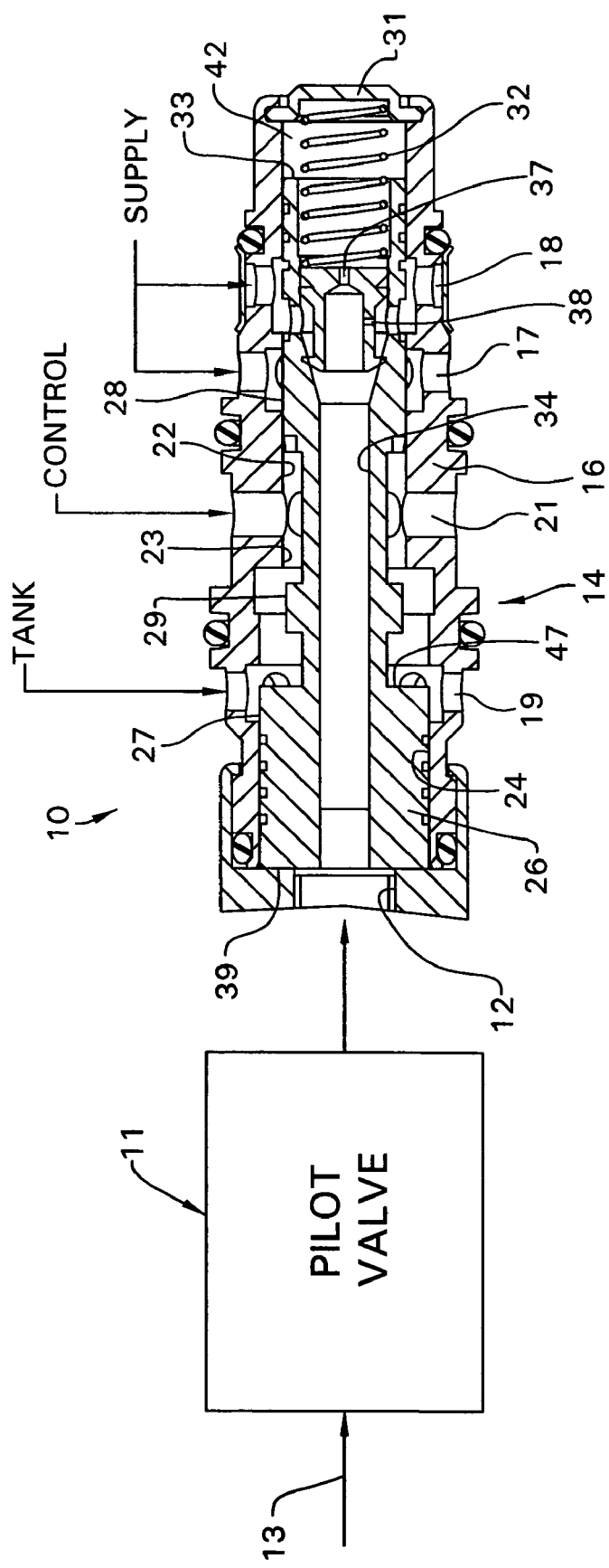
FIG. 1 is a longitudinal sectional view of a proportional pressure control valve embodying the invention and in a first OFF position of the spool therefor.

Certain terminology will be used in the following description for convenience in reference only and will not be limiting. The words "up", "down", "right" and "left" will designate directions in the drawings to which reference is made. The words "in" and "out" will refer to directions toward and away from, respectively, the geometric center of the device and designated parts thereof. Such terminology will include derivatives and words of similar import.

The drawings illustrate only two of many environments for the inventive proportional pressure control valve, and this disclosure is not to be limited thereto. Further, U.S. Pat. No. 6,021,876, owned by the same Assignee as owns the present invention, discloses an environment for a proportional pressure control valve and in which the present invention can be incorporated. The subject matter of U.S. Pat. No. 6,021,876 is to be incorporated herein by reference.

Referring now to FIG. 1 illustrating an inventive proportional pressure control valve 10, the pressure control valve 10 is comprised of two stages, namely a first stage and a second stage. The first stage is a pilot valve 11 which can be of any design for providing a hydraulic pressure at a varying rate from a high to a low value or a low to high value, by varying an electric input signal to it. Generally, there are three basic types of first stage pilots, namely, (1) a normally open type in which the pilot starts out with a low hydraulic pressure, with no electric input signal applied thereto, and increases in pressure, in a proportional manner, as the electrical signal is applied; (2) a normally closed type in which the pilot starts out with a high hydraulic pressure, without an electric signal applied thereto, and decreases in pressure, in a proportional manner, as the electrical signal is applied; and (3) a two-way type wherein the pilot starts out with a medium hydraulic pressure with no electrical input signal applied thereto, decreases in pressure in a proportional manner when the electric input signal is applied in one direction and increases in pressure, in a proportional manner, when the input signal is reversed. For the following disclosure, the first stage pilot 11 will be treated as the normally open type.

The first stage pilot 11 is only schematically illustrated in FIG. 1. It supplies a variable fluid pressure to a pilot output port 12 in response to a correspondingly variable electric signal applied to the input terminal 13. As an electrical signal applied to the input terminal 13 is increased from a low value toward a high value, the amount of hydraulic pressure at the fluid outlet port 12 is increased in proportion to the magnitude of the electrical signal urging the spool from the OFF condition illustrated in FIG. 1 to the ON position illustrated in FIG. 2.

The second stage of the proportional pressure control valve 14 includes an axially elongate valve body 16 having therein a pair of supply ports 17 and 18 spaced axially along the length thereof and both are configured to receive hydraulic fluid from a supply (not illustrated). To the left of the supply port 17, there is provided a tank port 19 configured for connection to a hydraulic fluid reservoir at atmospheric pressure and a control port 21 oriented intermediate the supply port 17 and the tank port 19. The valve body 16 includes a central bore 22 which, in this embodiment, has two different diameter sections 23 and 24. Supply port 17 is the port used to provide hydraulic fluid to the control port 21. Supply port 18 is used to supply the pilot valve 11 with hydraulic fluid via orifice 38.

A spool 26 is received in the bore 22 and includes a plurality of lands oriented along the length thereof. A first land 27 of a first diameter on the spool 26 is oriented in the part of the bore 22 having a diameter 24 while the remainder of the spool has a series of second lands 28 and 29 oriented in the part of the bore 22 having a diameter 23. The regions between the respective lands is of a further diameter less than the diameters 23 and 24. In the embodiment, the diameter of the bore part 24 is greater than the diameter of the bore part 23. The diameter of the lands 27 and 28 are correspondingly configured. The diameter of the land 29 intermediate the lands 27 and 28 is differently configured as explained in more detail below.

A spring abutment 31 is provided at the end of the valve body remote from the first stage pilot 11 and against which abuts a spring 32 oriented in a feedback chamber 42 between the aforesaid spring abutment 31 and an end 33 of the spool 26 remote from the first stage pilot 11. Furthermore, the spool has a hollow interior 34 extending lengthwise thereof with the end of the hollow interior 34 being closed off by a plug 36 having a first orifice 37 opening to the region between the plug and the spring abutment 31 and a further orifice 38 opening to communicate with the supply port. Orifice 37 is a damping orifice, well known in the industry, to eliminate high frequency instability in regard to the position of the spool and resulting control pressure variations, by slowing the axial response of the spool. The spring 32 biases the spool to the left and to the full OFF condition thereof when the electrical signal at the input 13 is reduced to zero. In this embodiment, the end of the spring 32 remote from the spring abutment 31 actually abuts the rightwardly facing surface of the plug 36.

An isolation chamber 53 is provided intermediate the control port 21 and the tank port 19 and in the pathway of the hydraulic fluid flowing therebetween. The purpose of this very important facet of the invention will be explained below.

Figure 2:
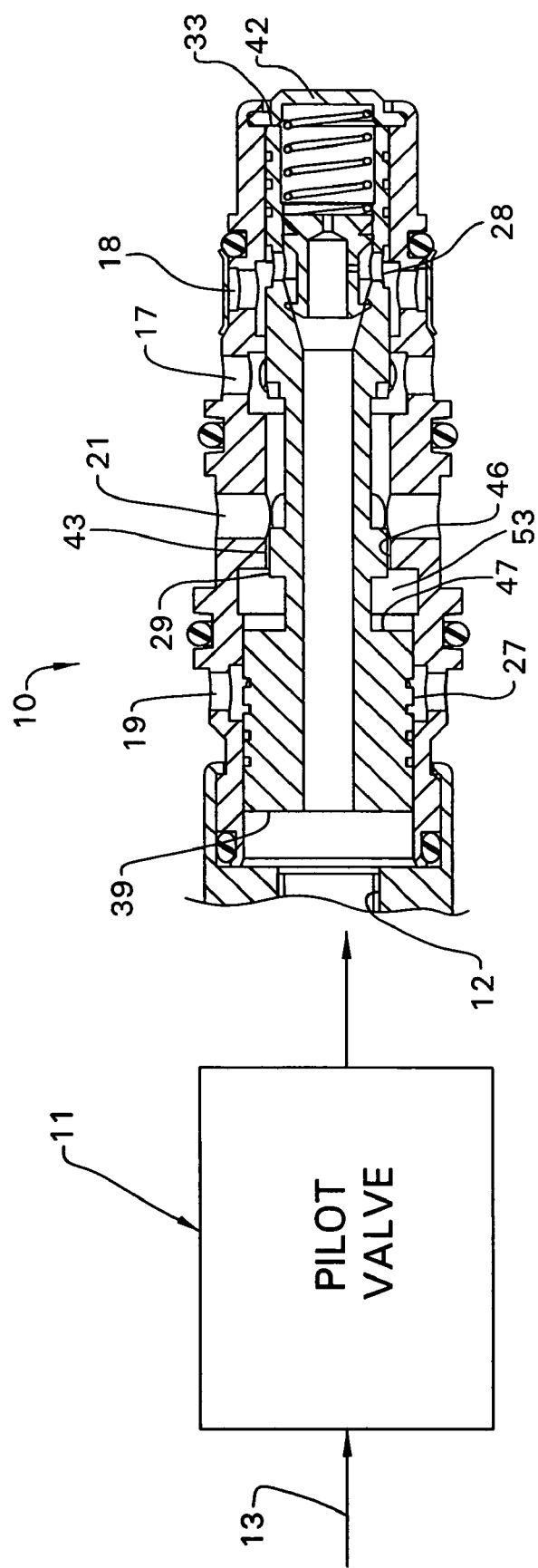
FIG. 2 is a view similar to FIG. 1 but the spool has been shifted to the right to a full ON position.
Figure 10:
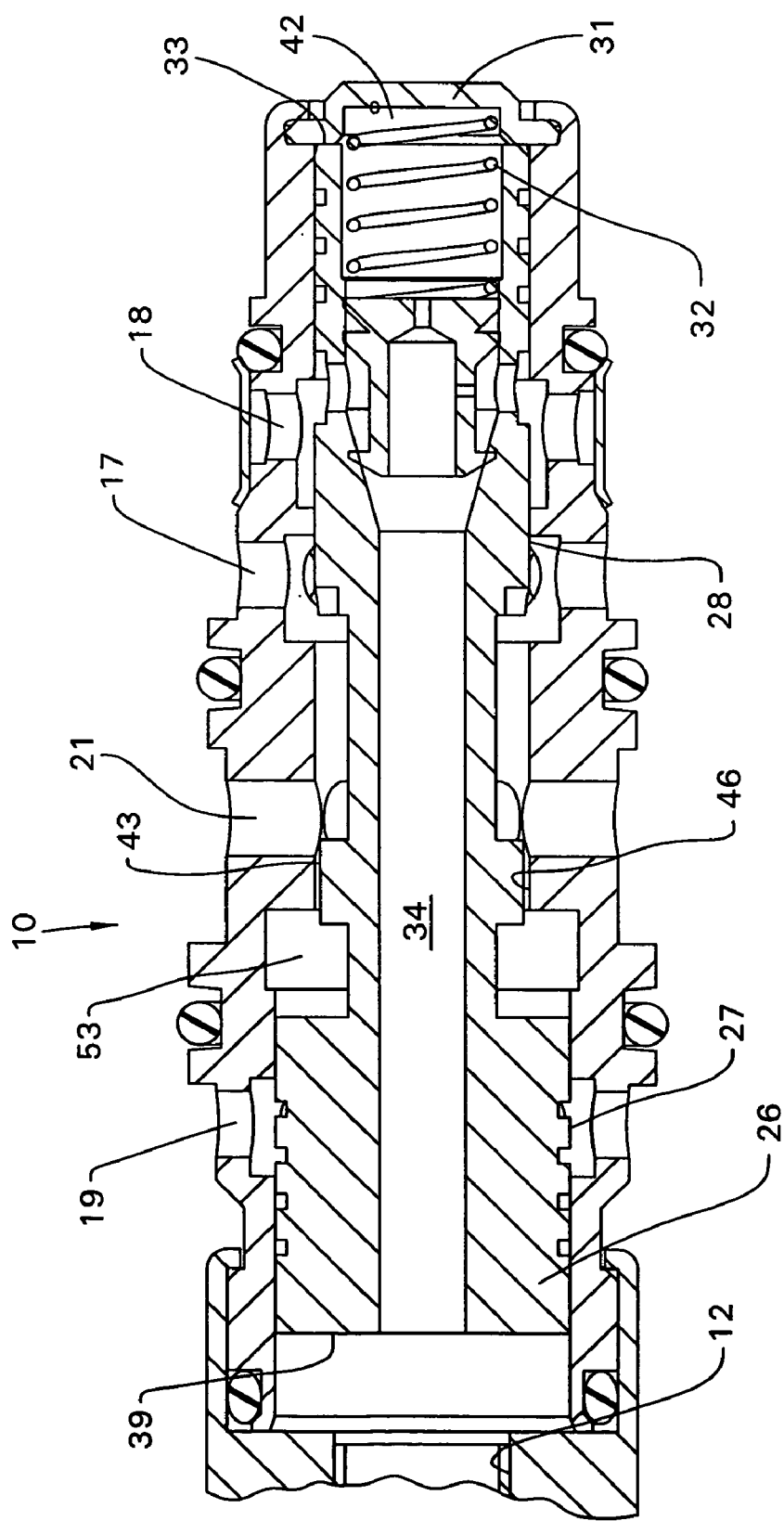
FIG. 10 is an enlarged fragment corresponding to FIG. 2 and showing the spool in Position 1.
Figure 11:
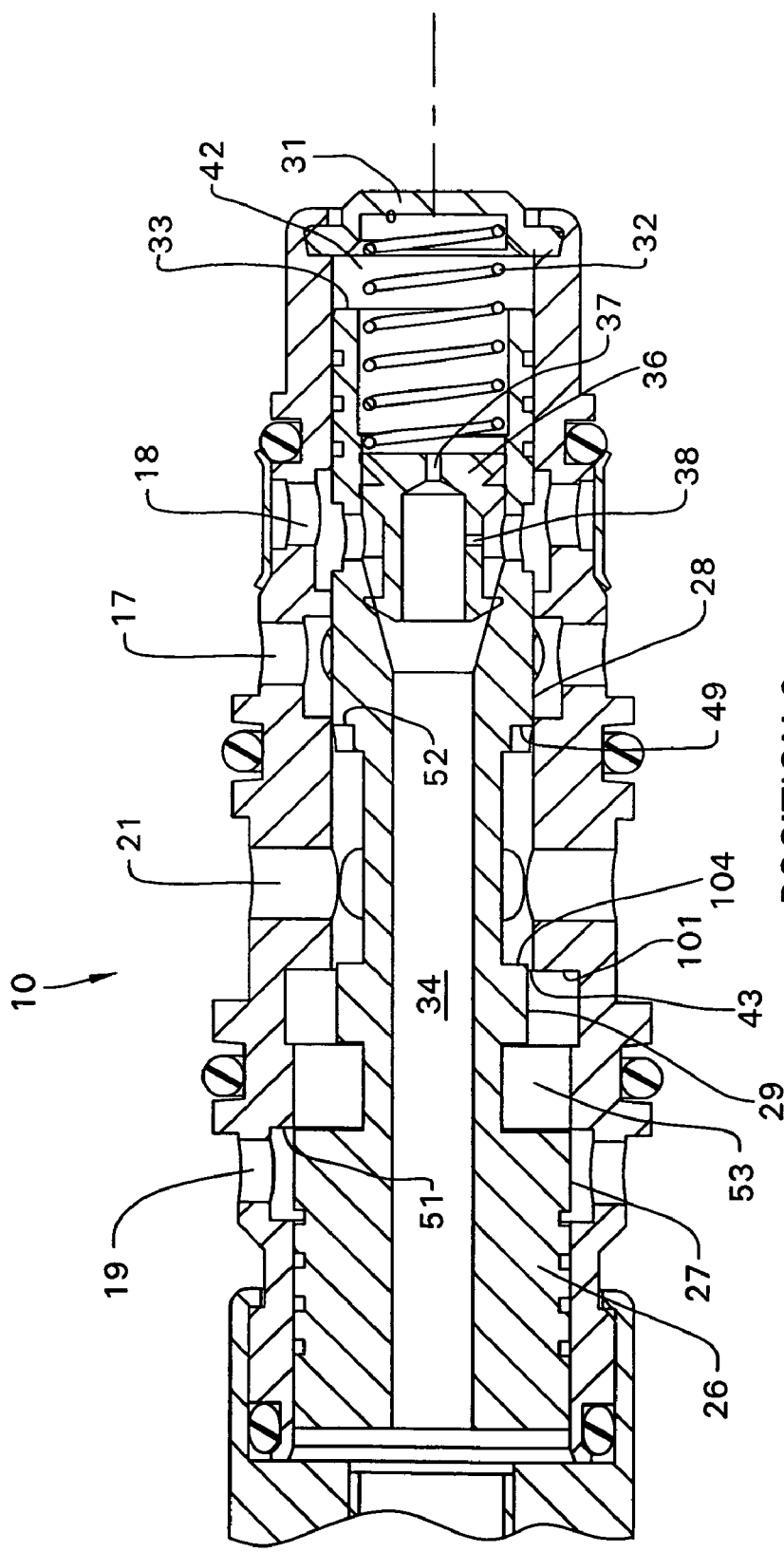
FIG. 11 is an enlarged fragment corresponding to FIGS. 3 and 4 and showing the spool in Position 2.
Figure 12:
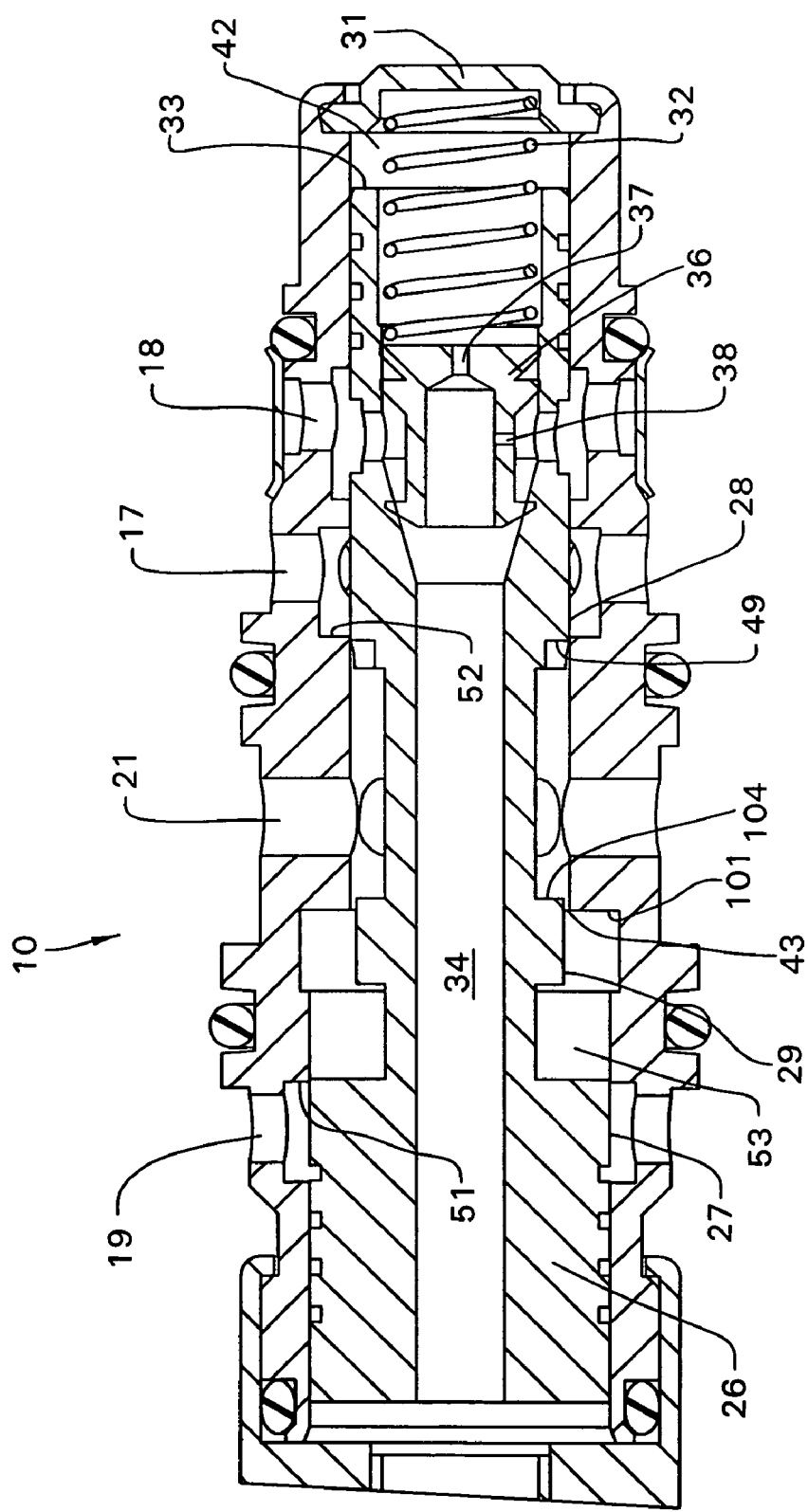
FIG. 12 is an enlarged fragment corresponding to FIGS. 3 and 4 and showing the spool in Position 3.
Figure 13:
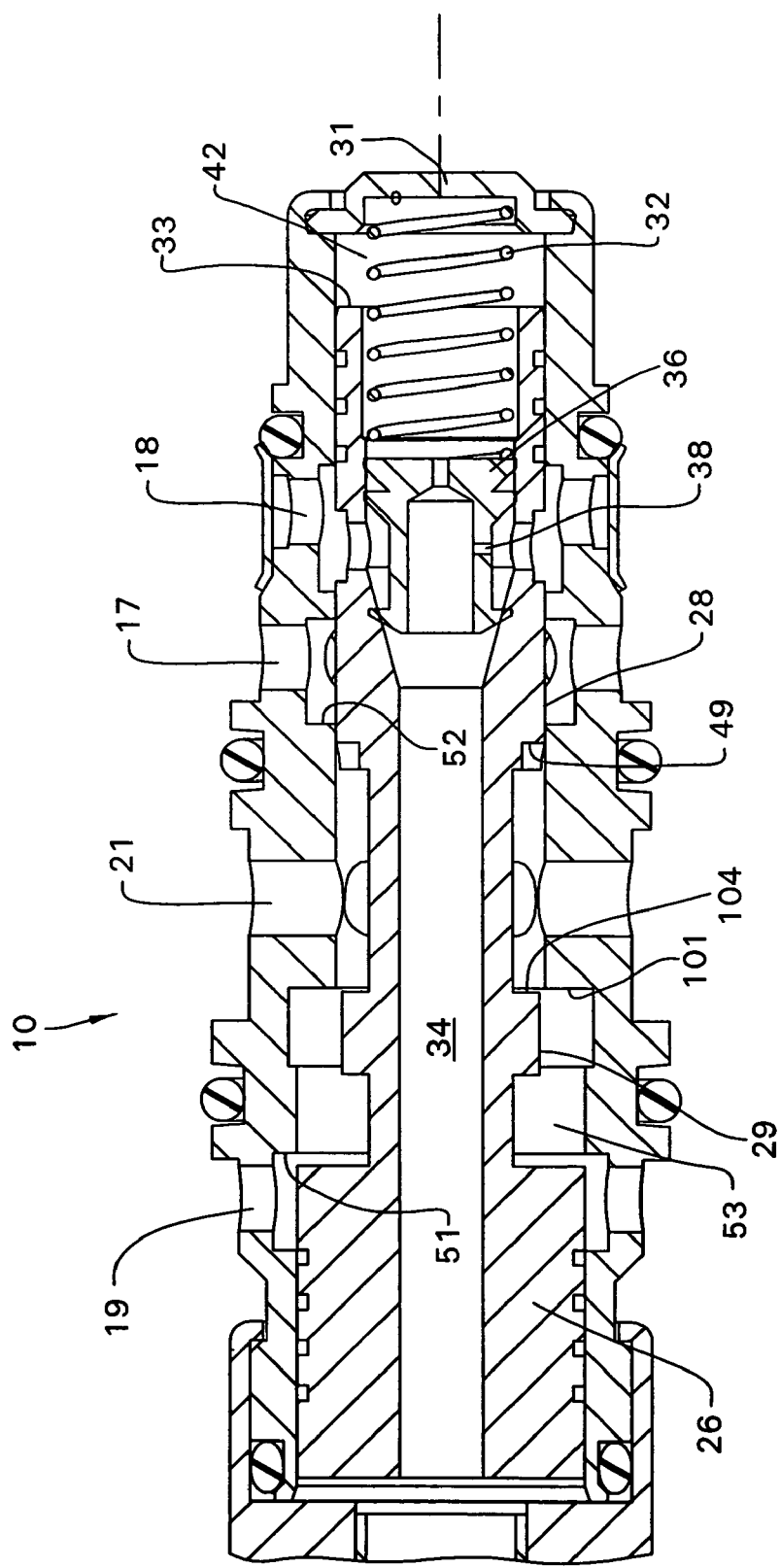
FIG. 13 is an enlarged fragment showing the spool in Position 4.
Figure 14:
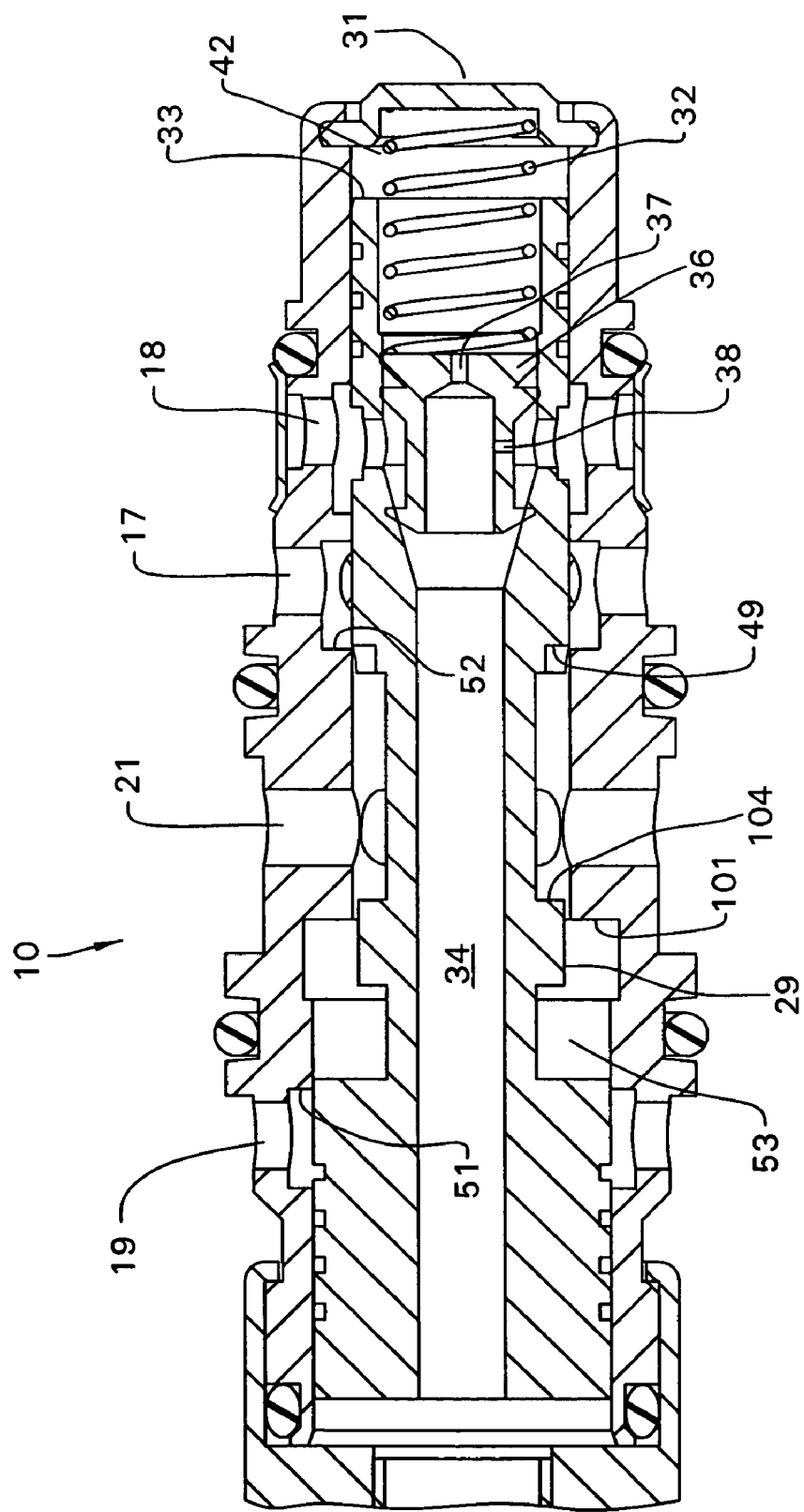
FIG. 14 is an enlarged fragment showing the spool in Position 5.

It is desirable to quickly present to the control port hydraulic fluid at a predetermined pressure level less than the pressure applied at the supply ports 17, 18. This desired pressure level is determined by the amount of hydraulic fluid pressure applied at the pilot outlet port 12. FIG. 2 illustrates the valve shown in FIG. 1 but with the spool thereof shifted to the full right most position, namely, the full ON position connecting the supply port 17 to the control port 21 while the tank port 19 is closed by reason of the land 27 closing off the connection between the control port 21 and the tank port 19. This means that the hydraulic fluid pressure load from the first stage pilot 11 acting on the spool is greater than the sum of the hydraulic fluid pressure acting on the end 33 and surface 47 of the spool and the spring force of the spring 32. Initially, utilizing hydraulic fluid supplied through orifice 38 from supply port 18, the first stage supplies hydraulic fluid pressure to pilot outlet port 12, spool end 39 and through damping orifice 37 to chamber 42 and spool end 33 creating a greater net force against the spring than the hydraulic fluid load in the isolation chamber 53 and spool surface area 47 plus the spring load exerted by spring 32. As a result, the spool 26 will be moved to the right to the aforesaid ON position (Position 1—FIG. 10). The ON position of the spool will cause the control port 21 and the isolation chamber via the radial spacing 43, to quickly fill with hydraulic fluid from supply port 17 and to cause the hydraulic pressure to quickly build in the control port 21 and the isolation chamber 53. The hydraulic fluid pressure will build to a point where the fluid pressure on surface 47 of the spool plus the spring load of spring 32 equals the net load on spool end 39. The hydraulic fluid entering the control port 21 passes through a radial spacing 43 provided between the land 29 on the spool mutually adjacent the land 27 and the land 46 on the valve body 16 applying the control port pressure to the side surface 47 of the land 27 remote from end surface 39. As a result, the control port pressure will continue to build, urging the spool leftward against the force of the hydraulic fluid supplied at the pilot outlet port 12. The area of fluid passage 43 is sized large enough so as to not add a substantial spool axial damping effect above that already provided by damping orifice 37 in plug 36 and so as to not slow the spool's response to the control pressure rise. This leftward spool movement will continue while the control pressure rises until the land 28 on the spool 26 begins to restrict the fluid flow from the supply port 17 and, consequently, the fluid pressure supplied at port 17 to the control port 21 (Position 5—FIG. 14). The spool continues its leftward movement, through its intermediate position as shown in FIG. 3 (Position 3—FIG. 12). Due to hydraulic fluid load on surface 47, the spring load of spring 32 and the spool momentum, the spool moves to Position 2 (see FIG. 11), opening side surface 47 of land 27 to tank port 19. The opening of surface 47 to tank creates an instantaneous pressure drop in the isolation chamber 53, acting on surface 47, as the pressurized hydraulic fluid in the control port 21 accelerates from control port 21 through radial gap 43 of spool 26 into the isolation chamber, past land 27 to tank. This will cause the pressure at pilot port 12 to slow then stop spool 26 in a position well short of the full OFF position (between Position 2—FIG. 11 and Position 4—FIG. 13) and where the fluid can pass relatively unrestricted from control port 21 past land 27 to tank. The actual position of the spool when the fluid is flowing from the control port to tank is determined by the pressure in the isolation chamber 53 working on surface 47 plus the bias spring load, in opposition to pilot outlet pressure 12. Due to this the spool will position itself in an optimum position where the control port pressure can be dissipated quickly in a controlled manner. As the control port pressure drops, so does the isolation chamber pressure and force on surface 47 allowing the pressure in pilot outlet port 12 to move the spool 26 in rightward direction in opposition to the lowering force on surface 47 so that at the point where the control port 21 pressure has reached the desired predetermined pressure the communication to tank is virtually shut off, minimizing how far the control port 21 pressure will fall below the aforementioned predetermined pressure before the spool 26 returns to the intermediate position, FIG. 3 (Position 3—FIG. 12) preventing the pressure from dropping any further. The spool 26, in response to pilot outlet pressure 12, will continue moving slightly in the rightward direction towards the ON position allowing the control port 21 pressure to increase to the desired predetermined pressure and returning the spool 26 to its required intermediate position and maintain the predetermined pressure with a minimal number of oscillations. Before, due to the momentum of the spool 26 and the control port 21 pressure acting directly on surface 47, without the radial clearance 43 provision, the spool would move leftward, uninhibited, to, or close to, the full OFF position, allowing the control port fluid pressure to be reduced to a level well below the predetermined control port fluid pressure requiring the spool, in response to the pilot pressure at port 12, to return to the ON position to regain the lost control port 21 fluid pressure and cause a repeat of the aforesaid cycle. The ability of the spool to stop and reverse directions as described above prior to the control port 21 losing its required pressure allows the spool 26 to establish its predetermined control port fluid pressure and position with a greatly reduced number of cycles at a much lower magnitude of control pressure spike over previous designs without the isolation chamber. If it is desired to increase the fluid pressure in the control port 21, a greater pressure will be applied to the pilot outlet port 12 to cause this to happen.

It should be noted that the incorporation of the isolation chamber 53 and radial clearance 43 is in addition to damping orifice 37. Damping orifice 37 is a small restrictive area and is used to reduce or eliminate undesirable high frequency instability which creates unpredictable control port fluid pressure and flow rates. The isolation chamber 53 utilizes a relatively large radial passage, as compared to orifice 37, in order to reduce or eliminate the much lower frequency control port pressure oscillation induced by demands for a change in control pressure. If, in an attempt to eliminate damping orifice 37, the isolation chamber 53 and radial passage 43 is used to accomplish both functions, another undesirable condition arises. This condition shows up not in the form of increased oscillation; to the contrary the number of oscillations do decrease, but the undesirable condition shows up as a pressure spike with a high time duration which in many cases is less desirable or less desirable than multiple oscillations of less individual time durations. This is caused by the required over restrictive passage from the control port to the isolation chamber which is required in order to eliminate high frequency instability. If an overly restrictive isolation chamber passage 43 is utilized, a high differential fluid pressure across passage 43 from the control port 21 to the isolation chamber 53 is still maintained, after the spool slowing instantaneous pressure drop described previously has occurred, allowing the spool 26 to move in the rightward direction in response to the pilot outlet port pressure 12 against the lower isolation chamber pressure on surface 47, restricting the opening from the isolation chamber across spool land 27 to tank. The combination of the restricted passage 43 and the restricted opening across spool land 27 to tank cause the control port 21 fluid pressure to lower slowly, prolonging the duration of time the excessive control port fluid pressure exists.

Referring to FIG. 4, there exists a longitudinal spacing L1 between an edge 51 of the tank port 19 and a closest edge 52 of the supply port 17. Further, there is provided a longitudinal spacing L2 between edge 47 of land 27 and a closest edge 49 of the land 28. In addition to these there is a longitudinal spacing L3 between edge 100 of land 29 and edge 101 of isolation chamber 53 and longitudinal spacing L4 between edge 51 of tank port 19 and edge 47 of spool land 27 which occur when the spool 26 is in the intermediate, pressure control, position depicted in FIGS. 3 and 4. It is well known and documented, in the proportional pressure control design field, that the relationship of L1 to L2 and the edge conditions thereof can be and are of a multitude of combinations depending on manufacturing cost, hydraulic system design, valve performance requirements and others; so suffice it to say that the implementation of this invention will improve the operation of these configurations as well as the one shown in FIG. 4. It is important though to the function of the invention that the relationship between L3 and L4 is that L3>L4. This is required in order that, per the disclosed invention, the fluid pressure has the ability to drop quickly in the isolation chamber 53 as the fluid accelerates from control port 21 across radial clearance 43 to the isolation chamber 53 allowing the spool 26 to slow or stop as described previously. The required amount of dimensional difference between L3 and L4 is influenced by a number of things such as if L2>L1. In this case there is an additional amount of fluid passing from the supply port to the control port and out to tank when the spool is in the intermediate position so that the relationship between L3 and L4 may have to be adjusted accordingly. In a typical application as depicted in FIG. 4, where L1>L2, L3 is 0.38 mm greater than L4.

In addition to the above, the size of damping orifice 37 and isolation area 43 are dependent on hydraulic system design and valve performance requirements as described above. In a typical application as depicted in FIG. 4, the damping orifice is a 0.635 mm diameter (0.317 sq. mm) and the isolation area 43 is 2.52 sq. mm.

Figure 8:
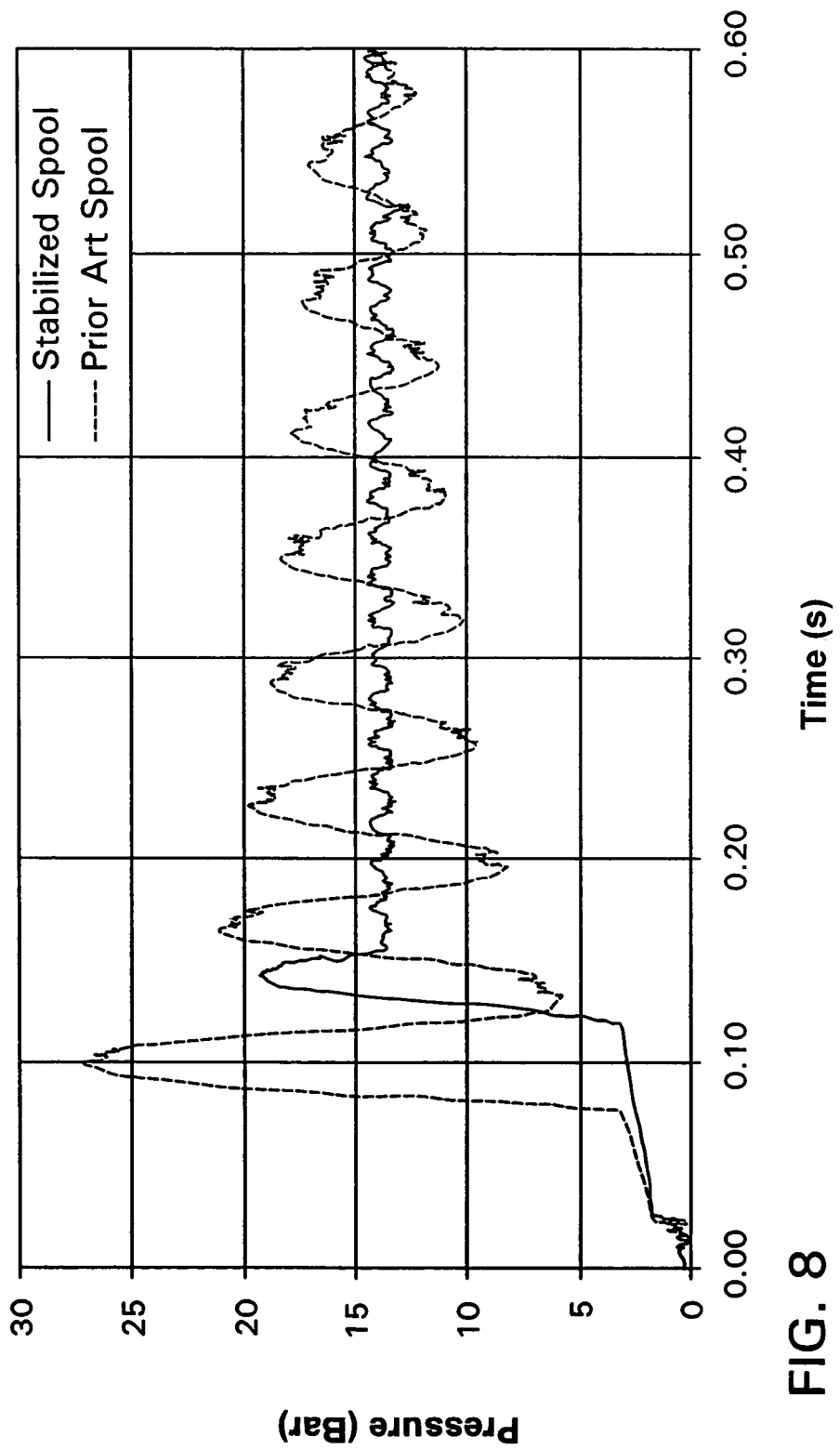
FIG. 8 is a graph depicting a comparison of stabilized versus unstabilized spool movements of the invention as compared to the prior art.

As stated above, it is an important facet of the invention to provide an isolation chamber 53 intermediate the control port 21 and the tank port 19 and in the pathway of the hydraulic fluid flowing therebetween. Since the radial spacing or gap 43 always provides a connection between the control port 21 and the isolation chamber 53, the isolation chamber 53 is always filled with fluid and there is no lag time that will occur because of the need to fill the isolation chamber before modulation can take place. Thus, the response of the valve is immediate and the number of reciprocations of the spool left and right within the valve body after a change in position of the spool has been initiated by the first stage pilot valve 11 is brought to a virtual halt as depicted in FIG. 8. While the prior art valve will undergo a "ringing", namely, an ongoing movement of the spool back and forth within the valve body after a change in position of the spool has been initiated by the first stage pilot valve 11, the inventive construction brings that "ringing" to a halt in less than 0.255 seconds when the pressure applied to the control port is varied from zero to 14 bars. In this instance, the desired pressure level of the hydraulic fluid at the control port 21 is to be held at approximately 14 bars. While the fluid pressure at the supply port 17 is substantially higher than 14 bars, as depicted in FIG. 8, and after about 0.20 seconds the spool 26 will oscillate a small amount, (namely, in a range of about 0.025-0.127 mm, usually about 0.050 mm) to cause the pressure at the control port 21 to vary by less than 0.3 bars, preferably less than 0.2 bars. The important thing to note is that the spool basically is urged toward the full ON position and thence toward the closed position and then again back toward the open position before the oscillations of the spool are brought under control between the time period of 0.10 and 0.20 seconds.

Figure 9:
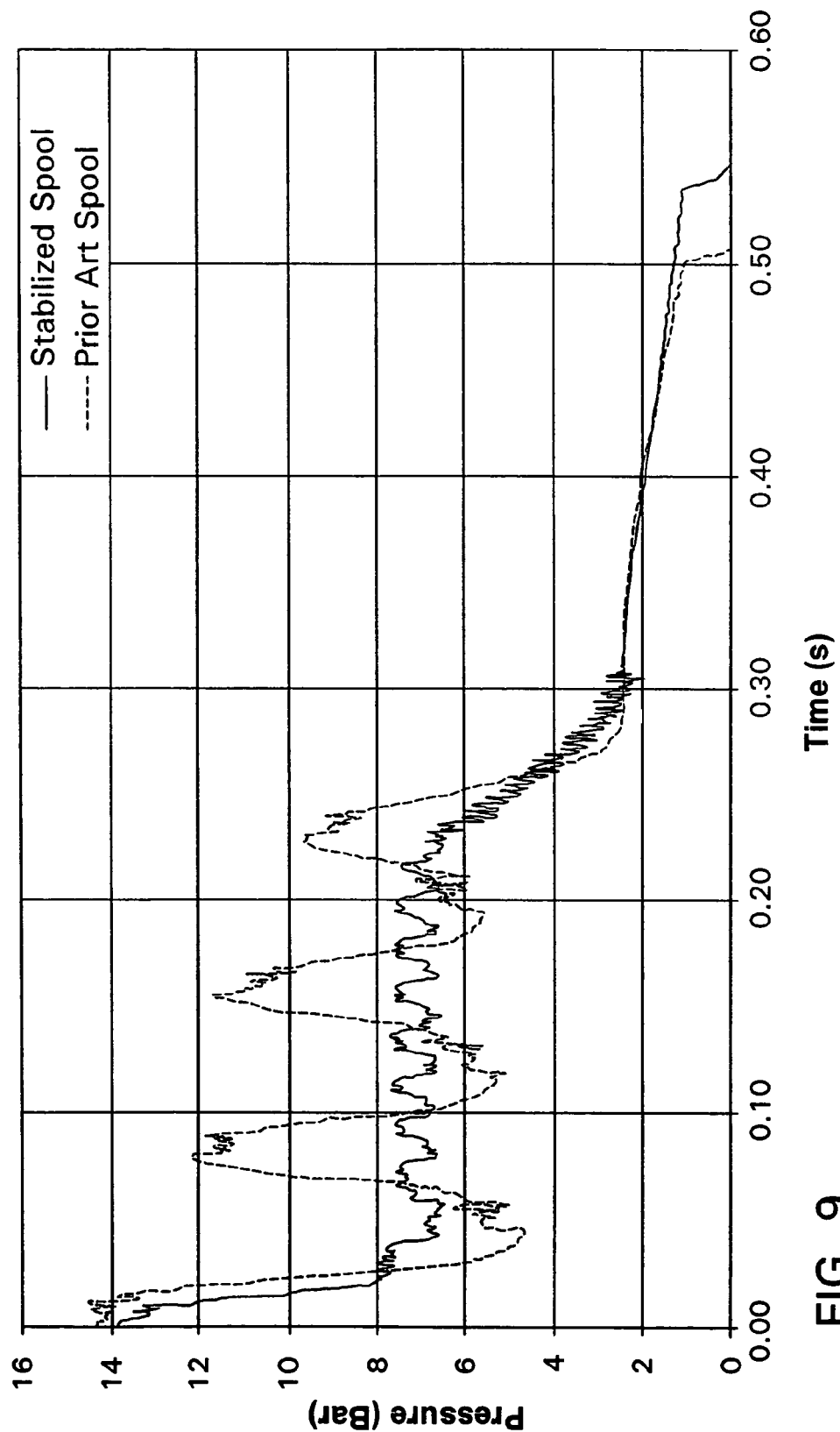
FIG. 9 is a graph showing a comparison of stabilized versus unstabilized spool movement during a timed reduction of the control port pressure by the inventive valve as compared to the prior art.

In instances where the inventive valve is to be "dumped" from the desired level at 14 bars to an initial 7 bars pressure level with a ramp to zero bar thereafter, FIG. 9 compares the reaction of the inventive valve to the prior art valve. It will be noted that the "dump" from 14 bars to 7 bars occurs almost instantaneously to cause the pressure at the control port to hold essentially steady at 7 bars until the pressure is to move to zero bar. As with the prior art valve there is a "ringing", namely, a substantial back and forth movement of the spool to vary the pressure at the control port to undesirable levels greater than 2 bars for a period of time before the ramp to zero bar occurs.

Figure 5:
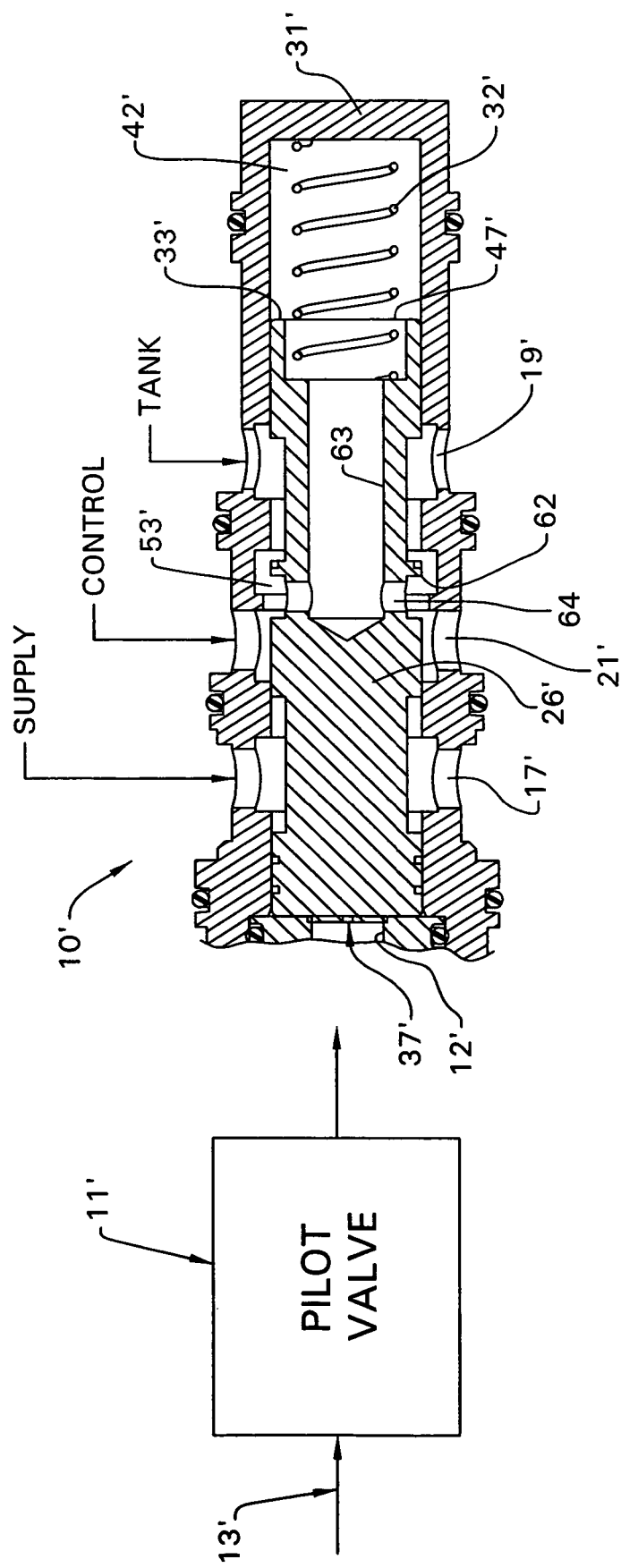
FIG. 5 is a second embodiment of the proportional pressure control valve wherein, unlike the embodiment of FIGS. 1-4 wherein the lands of the spool have two different diameters, the lands on the spool have a single diameter and the valve is in the full OFF condition.
Figure 6:
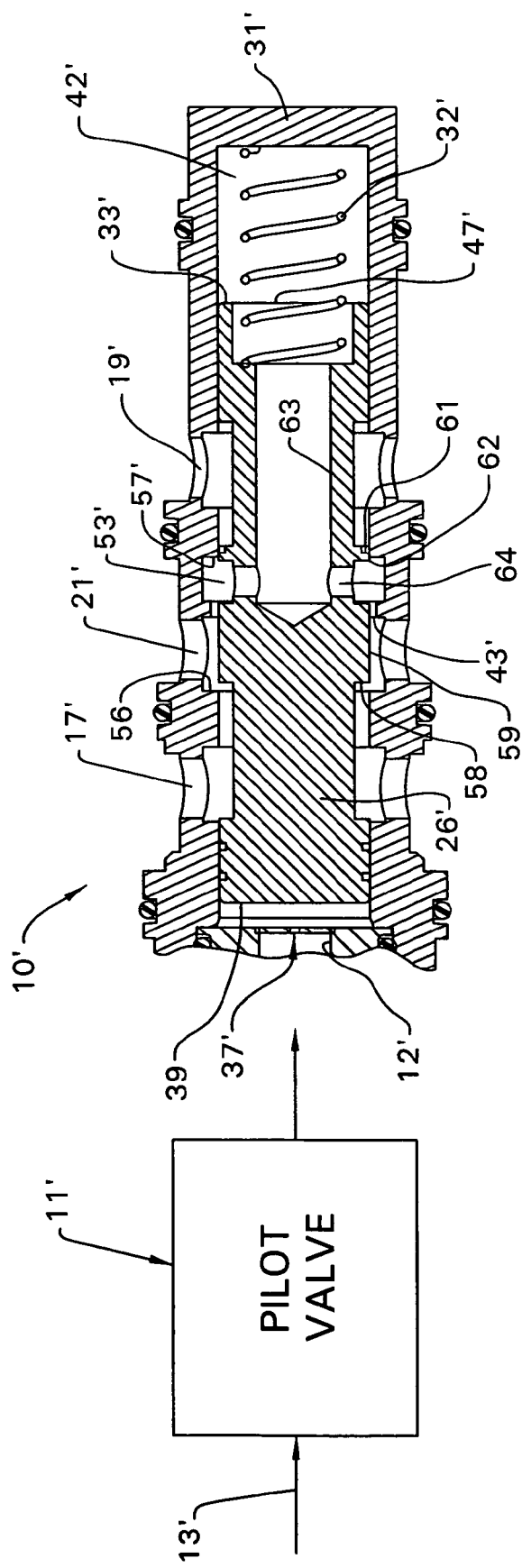
FIG. 6 is a view similar to FIG. 5 except that the spool has been shifted to the right to a full ON condition.
Figure 7:
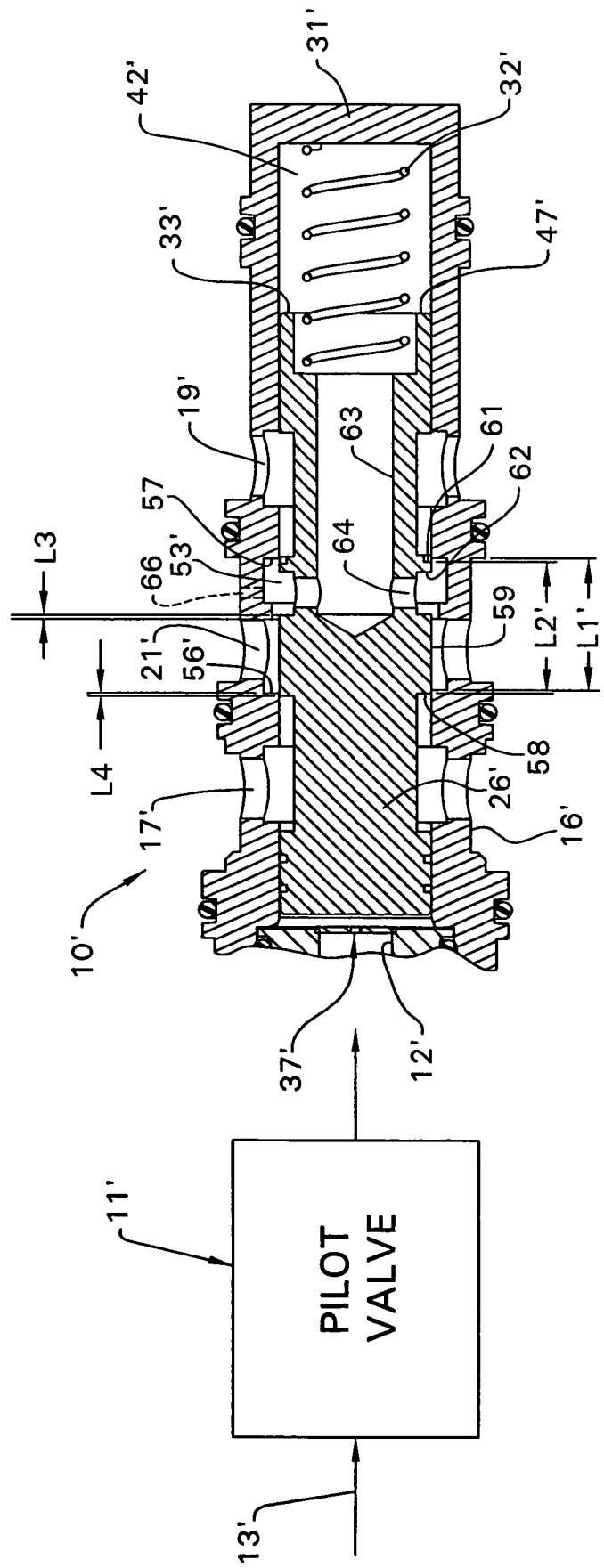
FIG. 7 is a view similar to FIG. 5 except that the spool has been shifted to the modulation position.

A modified proportional pressure control valve 10' is illustrated in FIGS. 5-7 which operates the same way as the embodiment of FIGS. 1-4, only that there is a reversal of the supply port 17' and tank port 19'. Since the valve componentry is basically the same in the two embodiments, the same reference numerals that have been used for FIGS. 1-4 will be used in FIGS. 5-7, but with a prime (') suffix. FIG. 5 illustrates the spool in the full OFF condition and FIG. 6 illustrates the spool in the full ON position while FIG. 7 illustrates the spool in the modulating position. In this particular embodiment, the longitudinal spacing between an edge 56 of the control port 21' closest to an edge 57 between the isolation chamber 53 and the tank port 19' is a dimension L1' whereas the longitudinal spacing between an edge 58 of the land 59 opposing the edge 56 and an edge 61 on the land 62 opposing the edge 57 between the isolation chamber 53' and the tank port 19' is a dimension L2' less than the dimension L1' by an amount equal to 0.25 mm.

In the embodiment of FIGS. 5-7, pressure applied to the pilot outlet port 12' causes the spool 26' to be moved toward the right against the urging of the spring 32' to cause pressurized hydraulic fluid to flow from the supply port 17' to the control port 21'. Pressurized hydraulic fluid will also flow through the radial spacing or gap 43' into a bore 63 in the spool 26' through an opening 64 interconnecting the isolation chamber 53' to the interior of the bore 63. As a result, supply pressure will build up on the end 47' of the spool 26' to urge the spool 26' leftwardly against the pressure applied at the pilot outlet port 12'. Such leftward movement of the spool 26' will occur until the edge 58 on the land 59 restricts the fluid flow and fluid pressure from the supply port 17' to the control port 21' and, due to the momentum of the spool 26' to the left, there will be a separation between the edge 61 and the edge 57 to connect the isolation chamber 53' to the tank port 19' to reduce the pressure in bore or chamber 63 and surface 47' thereat thereby effecting a stoppage and reversal of the direction of the spool 26' so that it moves to the right again.

The graphs of FIGS. 8 and 9 also apply to the embodiment of FIGS. 5-7.

It will be recognized by those of ordinary skill in the art that the radial clearance or gap 43 can be reduced to zero provided there is an auxiliary port 66 located adjacent the control port 21, 21' and the tank port 19, 19' and opening into the isolation chamber 53, 53'. A broken line representation of the auxiliary port 66 is illustrated in FIGS. 3 and 7.

Although particular preferred embodiments of the invention have been disclosed in detail for illustrative purposes, it will be recognized that variations or modifications of the disclosed apparatus, including the rearrangement of parts, lie within the scope of the present invention.

What is claimed is:

1. A proportional pressure control valve, comprising:
  an electric first stage pilot having a single outlet port configured to provide a variable pressurized hydraulic fluid to said outlet port and at a pressure that is proportional to an electric input signal and which is variable between first and second values;
  a second stage hydraulic valve having a valve body with a bore extending therein and a spool reciprocally movable in said bore between first and second positions indicative of a full ON and a full OFF condition, a first end of said bore being coupled to said outlet port of said electric first stage pilot;
  a spring abutment in said bore only at a second end remote from said first end, a spring oriented between and abutting said spring abutment and an end of said spool remote from said outlet port on said first stage pilot and urging said spool to oppose said pressurized hydraulic fluid at said first stage outlet port;
  said second stage further including (1) a supply port on said valve body and configured for having supplied thereto a continuous high pressure hydraulic fluid; (2) a tank port on said valve body and configured for connection to a tank pressure; and (3) a control port configured for connection to a load;
  said spool having plural regions of a first diameter and plural axially spaced lands of a second diameter greater than said first diameter thereon slidingly and sealingly engaging an interior wall of said bore to control a rate of hydraulic fluid flow and a pressure of the hydraulic fluid between said supply port and said control port as well as between said control port and said tank port in response to an axial movement of said spool relative to said valve body;

a fluid isolation chamber oriented in said bore and a region between said control port and said tank port and being defined by said interior wall of said bore and a region of said first diameter mutually adjacent thereto that serves as a passage to interconnect said control port and said tank port, said interior wall of said bore and said first and second diameters on said spool being configured to:

A. supply, when said spool is in said first position, unobstructed pressurized hydraulic fluid from said supply port to said control port simultaneously with a closing of a fluid connection of said control port to said tank port;

B. supply, when said spool is in said second position, unobstructed flow of hydraulic fluid from said control port to said tank port simultaneously with a closing of a fluid connection of said supply port to said control port;

C. always provide a controlled volume fluid flow path between said control port and said fluid isolation chamber which is substantially less in volume than the supply of pressurized hydraulic fluid to said control port when said spool is in said first position and always independent of spool position so that said isolation chamber will house said hydraulic fluid at a pressure controlled by said electric first stage pilot;

to thereby prevent a prolonged period of axial oscillations of said spool with respect to said valve body after said first stage pilot has initiated an axial shifting of said spool to a position intermediate one of said first and second positions to quickly bring the hydraulic fluid pressure in said control port and thence said isolation chamber to a predetermined level.

2. The proportional pressure control valve according to claim 1, wherein said prolonged period of axial oscillations is limited to a range of 0.01 to 0.30 seconds.

3. The proportional pressure control valve according to claim 1, wherein said prolonged period of axial oscillations is limited to a range of 0.10 to 0.20 seconds.

4. The proportional pressure control valve according to claim 1, wherein said prolonged period of axial oscillations is limited to a range of 0.01 to 0.10 seconds.

5. The proportional pressure control valve according to claim 1, wherein during said period of axial oscillations a spool movement of no greater than about 0.127 mm occurs.

6. The proportional pressure control valve according to claim 1, wherein said period of axial oscillations causes a pressure variation of no greater than about 0.3 bars.

7. The proportional pressure control valve according to claim 1, wherein said period of axial oscillations causes a pressure variation of no greater than about 0.2 bars.

8. The proportional pressure control valve according to claim 1, wherein said prolonged period of axial oscillations is limited to a range of 0.01 to 0.30 seconds; and wherein said period of axial oscillations causes a pressure variation of no greater than about 0.3 bars.

9. The proportional pressure control valve according to claim 1, wherein said prolonged period of axial oscillations is limited to a range of 0.10 to 0.20 seconds; and wherein said period of axial oscillations causes a pressure variation of no greater than about 0.2 bars.

10. The proportional pressure control valve according to claim 1, wherein after an expiration of said period of axial oscillations, a spool movement no greater than 0.05 mm occurs to maintain said hydraulic pressure at said predetermined level plus or minus a range of 0.2 to 1.0 bars.

\* \* \* \* \*